United States Patent [19]

Patterson, III et al.

[11] 4,223,869

[45] Sep. 23, 1980

[54] LOAD BINDER APPARATUS

[76] Inventors: William W. Patterson, III; Eugene F. Grapes, both c/o W. W. Patterson Company, 830 Brocket St., Pittsburgh, Pa. 15233

[21] Appl. No.: 968,452

[22] Filed: Dec. 11, 1978

Related U.S. Application Data

[63] Continuation-in-part of Ser. No. 864,690, Dec. 27, 1977, Pat. No. 4,131,264, which is a continuation-in-part of Ser. No. 805,185, Jun. 9, 1977, abandoned.

[51] Int. Cl.³ .............................................. B66F 3/08
[52] U.S. Cl. ................... 24/68 CD; 254/231; 24/279
[58] Field of Search ............... 254/67, 100, 83, 93 H; 403/43–48; 24/68 CD, 279

[56] References Cited

U.S. PATENT DOCUMENTS

| | | | |
|---|---|---|---|
| 1,489,123 | 4/1924 | Heatherington | 254/67 |
| 1,552,810 | 9/1925 | Webster | 254/67 |
| 2,120,497 | 6/1938 | Heinrich | 254/67 |
| 2,434,949 | 1/1948 | Mueller | 254/93 H |

FOREIGN PATENT DOCUMENTS 380846  9/1923  Fed. Rep. of Germany ............. 254/67

*Primary Examiner*—Robert C. Watson
*Attorney, Agent, or Firm*—Buell, Blenko & Ziesenheim

[57] ABSTRACT

A load binder or lashing tightener is provided made up of a first inner elongate sleeve member closed at one end, an anchor fitting on said closed end, a thread nut in the other end of said first sleeve, a second outer sleeve having one end adapted to telescope over the first inner sleeve, anchor means on said second sleeve adjacent said one end, screw means extending through the second sleeve, one end threadingly engaging the nut in said first sleeve, the other end rotatably fixed in the said other end of said second sleeve and hand wheel drive means on said other end for rotating said screw whereby said second sleeve is caused to telescope over the first sleeve and the anchor means on said sleeves are brought together.

8 Claims, 4 Drawing Figures

U.S. Patent    Sep. 23, 1980    4,223,869
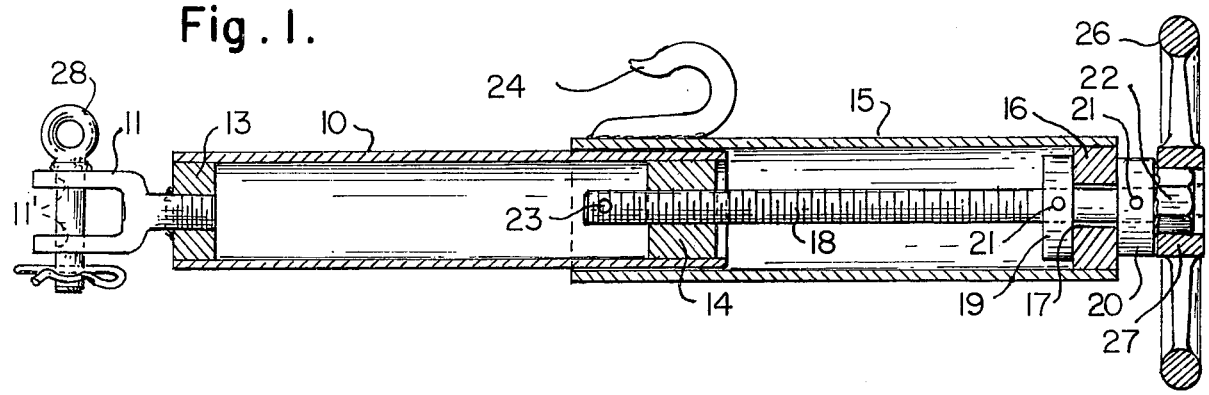
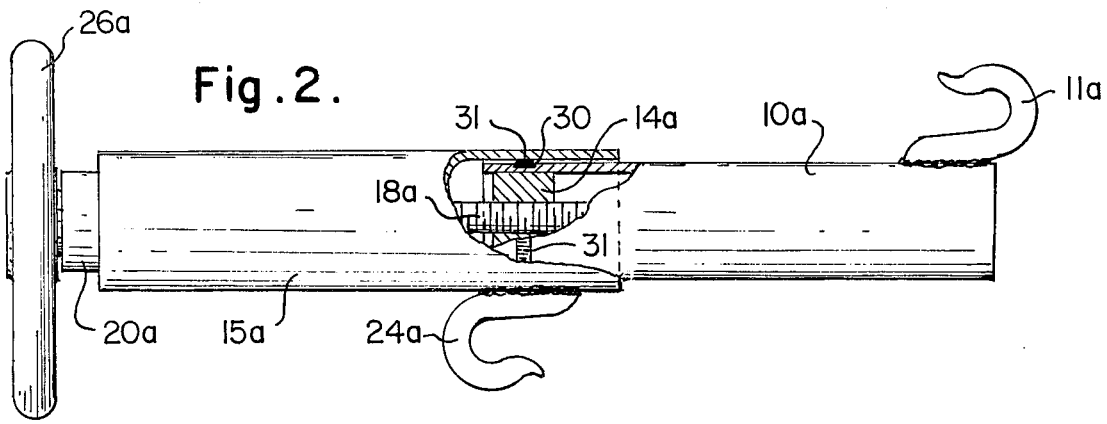
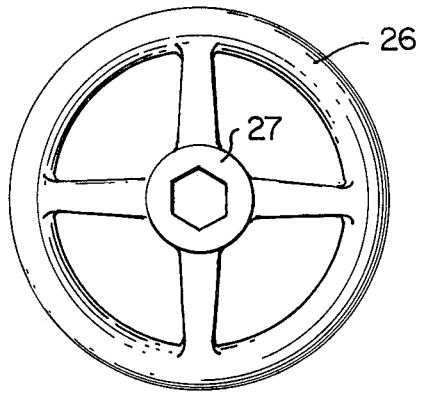
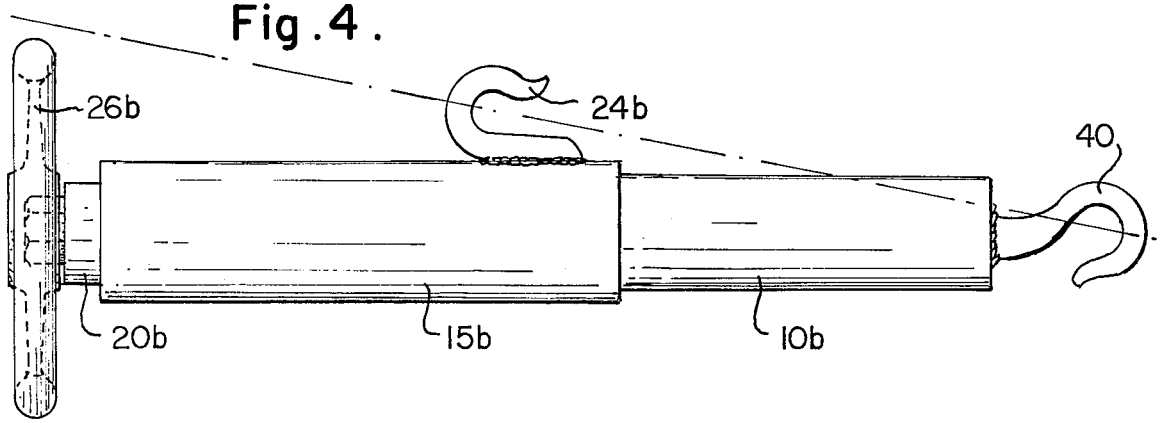

LOAD BINDER APPARATUS

This application is a continuation-in-part of our co-pending application Ser. No. 864,690, filed Dec. 27, 1977 now U.S. Pat. No. 4,131,264 which was a continuation-in-part of our application Ser. No. 805,185, filed June 9, 1977 now abandoned.

The present invention relates to load binder apparatus and particularly to a quick power lashing mechanism for tightening lashing cables and chains and the like rapidly to bind or lash a load in place and is an improvement on the invention of application Ser. No. 864,690 now U.S. Pat. No. 4,131,264.

Load binder and lashings of many kinds have been employed in binding a load in place as for example on a truck bed, a ship deck or hold, a railway car, etc.

In the past, load binders have generally been of the ratchet type or the cam lever type. In the ratchet type binder, tightening is relatively slow. In the case of the cam lever type, they may be applied quickly but they have a very limited travel and are prone to come loose and release the load.

The load binder or lashing apparatus of application Ser. No. 864,690 now U.S. Pat. No. 4,131,264 difficulties. That load binder is quickly applied and will not release its load unless improperly applied. Unlike turnbuckles, the threads are completely enclosed and driven by a nut driver such as an air or electric wrench, and unlike both turnbuckles and lever cam binders, the binder of that invention cannot be readily tampered with or loosened without a proper wrench. Practically, however, that load binder required a source of air or electricity and a corresponding impact wrench or alternatively a ratchet wrench and the theft of such wrenches made the use of the binder impractical.

We now provide a load binder similar to that of application Ser. No. 864,690 now U.S. Pat. No. 4,131,264 comprising a first elongate sleeve member closed at end and carrying an anchor fitting at said one end, the other end of said first sleeve is provided with a threaded nut fixed therein, a second sleeve member sufficiently larger in internal diameter so as to telescope over the first sleeve is provided, one end of said second sleeve receiving said other end of said first sleeve in telescopic relation, the other end of said second sleeve is provided with a collar through which extends a threaded screw engaged in the nut of the first sleeve and having a hand wheel driver nut head whereby said screw is rotated in the nut to move the second sleeve relative to the first and an anchor fitting on said second sleeve adjacent said one end of said second sleeve. Preferably, the screw is provided with load collars of bearing material fixed thereto on opposite sides of the swivel collar to provide reduced friction between the several collars. Preferably, the screw is a multiple pitch thread screw for rapid, safe take-up. A stop or lock pin is preferably provided on the end of the screw within the first sleeve to prevent its removal from the nut. The anchor fittings are preferably in the form of clevises, however, they may be eye hooks, or any type of anchor fitting. Preferably, the anchor fittings are on the sides of the sleeves, on diametrically opposite sides, with the sleeves being freely rotatable relatively to one another.

In the foregoing general description we have set out certain objects, purposes and advantages of our invention. Other objects, purposes and advantages of this invention will, however, be apparent from a consideration of the following description and the accompanying drawings in which:

FIG. 1 is a longitudinal sectional view of one embodiment of our invention;

FIG. 2 is a side elevational view partly in section of a second embodiment of our invention; and FIG. 3 is an end elevation of the hand wheel as viewed from the left of FIG. 2; and FIG. 4 is an elevational view of a third embodiment of our invention.

Referring to the drawings, we have illustrated in FIG. 1 a first sleeve member 10 of tubular cylindrical form having a clevis 11 welded on cylinder 10 in end plug 13 which is welded in and closes one end of the sleeve. The other end of sleeve 10 is provided with an Acme threaded nut 14 welded thereon. A second cylindrical sleeve 15 is arranged to telescopically receive first sleeve 10 in one end thereof and is provided at the opposite end with a swivel collar 16 having a hole 17 through which passes Acme threaded screw 18. Screw 18 is provided at one end with spaced load collars 19 and 20 on opposite sides of swivel collar 16. Load collars 19 and 20 are preferably of bearing material such as brass or bronze and are held in place by pins 21. This same one end is provided with a driver nut 22 welded thereon for rotating the screw. The opposite end of the screw 18 passes through nut 14 in first sleeve 10 and is provided with a lock pin 23. A hook 24 is fixed on the side wall of second sleeve 15 adjacent the end remote from driver nut 22. A hand wheel 26 is fitted on driver nut 22 for rotating the same. The hand wheel 26 may have a hub 27 with an opening adapted to fit nut 22 or it may be fixed on nut 22 by welding. The diameter of wheel 26 is such that its periphery lies below a line through the center of clevis 11 and hook 24 when the binder is in its extended position.

In use, the screw 18 is rotated by hand wheel 26 to move the two sleeves apart as in FIG. 1; a pin 28 is inserted through holes 11' in clevis 11 and through a loop (not shown) in one end of a cable lashing, or a link (not shown) of a chain lashing as the case may be, the hook 24 is inserted through a loop (not shown) or a chain link (not shown) at the opposite end of the lashing. The nut 22 is engaged by hand wheel 26 and rotated to run the screw 18 through nut 14 into the interior of sleeve 10 causing the sleeves to telescope, 15 over 10 and, thus, bring clevises 11 and 24 toward each other, tighening the cable or chain lashing. The lashing is released by reversing the rotation of screw 18 to move the sleeves and clevises apart. The screw 18 is totally enclosed in this structure and is thus unaffected by dirt, weather or any of the circumstances which cause binders of the prior art to be inoperable or even fail. Placing the clevises 11 and 24 on the sides as in FIG. 2 permits the cylinders 10 and 15 to swivel relatively to one another under load and permits use of a larger diameter hand wheel. This provides much greater efficiency of operation than the other embodiments illustrated. By efficiency we mean that the embodiment of FIG. 2 requires much less effort applied to screw 18 to attain a given level of tension on the load being lashed.

In FIG. 2, we have shown a structure precisely like that of FIG. 1 with like parts bearing like numbers with the suffix a, except that in the embodiment we have used hook 11a on the side of sleeve 10a and provided a sealant groove 30 in the external wall of the inner sleeve 10a at nut 14a and have fixed a hook 11a on the side of sleeve 10a at its end. A graphite impregnated felt seal ring 31 is inserted in this groove 30 and bears against the inner wall of outer sleeve 15a. This acts further to seal the device against water and dirt and aids in carrying the telescoping members with a minimum of friction.

In FIG. 4 we have illustrated a third embodiment of our invention similar to FIG. 1 with like parts carrying identical numerals with the suffix b. In this embodiment hook 40 has been substituted for clevis 11 of FIG. 1. The structures are otherwise basically identical.

We have illustrated a driver nut head on the screw of our structure which is adapted to removably receive a hand wheel having an opening in the hub adapted to fit onto the nut head; however, the hand wheel could be integrally attached to the driver head.

While we have illustrated and described certain preferred practices and embodiments of our invention in the foregoing specification, it will be understood that this invention may otherwise embodied within the scope of the following claims.

We claim:

1. A load binder and lashing tightener apparatus comprising a first inner elongate sleeve member closed at one end, an anchor adjacent said closed end, a threaded nut fixed in the other end of said first sleeve, a second outer sleeve having one end adapted to telescope over the first inner sleeve in close fitting relationship, anchor means on said second sleeve adjacent said one end, screw means extending through the second sleeve, one end threadingly engaging the nut in said first sleeve, the other end rotatably fixed in the said other end of said second sleeve and hand wheel drive means on said other end for rotating said screw whereby said second sleeve is caused to telescope over the first sleeve and the anchor means on said sleeves are brought together, said sleeves being freely rotatable relative to one another, said hand wheel having a diameter and the anchor means being arranged on said sleeves such that the periphery of the wheel lies below a line through the center of the two anchor means in all positions of said anchor means, said sleeves being freely rotatable relative to one another, and wherein the sleeves are of cylindrical form having said anchor means on each of said sleeves, whereby said anchor means are free to align themselves to provide maximum pull through the binder.

2. A load binder or lashing tightener as claimed in claim 1 wherein the drive means is a driver nut head on the screw removably receiving a drive hand wheel.

3. A load binder as claimed in claim 1 wherein the sleeves are of cylindrical form having anchor means on each of said sleeves extending radially outward from each sleeve on opposite sides from each other.

4. A load binder or lashing tightener as claimed in claim 3 wherein the anchor means on at least one said sleeves is a clevis.

5. A load binder or lashing tightener as claimed in claim 3 wherein the anchor means on each said sleeves is a hook.

6. A load binder or lashing tightener as claimed in claim 3 having sealing means between the inner and outer sleeves adjacent the said other end of said inner sleeve.

7. A load binder or lashing tightener as claimed in claim 6 wherein the sealing means is a graphite impregnated felt ring carried in an annular groove in said first sleeve.

8. A load binder or lashing tightener as claimed in claim 1 wherein the one end of said screw means carries a stop means preventing the screw from being removed from the nut in the first sleeve.

* * * * *

UNITED STATES PATENT AND TRADEMARK OFFICE
CERTIFICATE OF CORRECTION

PATENT NO. : 4,223,869

DATED : September 23, 1980

INVENTOR(S) : WILLIAM W. PATTERSON, III and EUGENE F. GRAPES

It is certified that error appears in the above-identified patent and that said Letters Patent are hereby corrected as shown below:

Column 1, line 25, after "U.S. Pat. No. 4,131,264", --basically overcomes these-- should be inserted.

Signed and Sealed this

Sixteenth Day of December 1980

[SEAL]

Attest:

SIDNEY A. DIAMOND

Attesting Officer

Commissioner of Patents and Trademarks